J. BLACKIE.
Machine for Preparing Tobacco.
No. 53,105.　　　　　　　　　　　　　　　　Patented March 13, 1866.
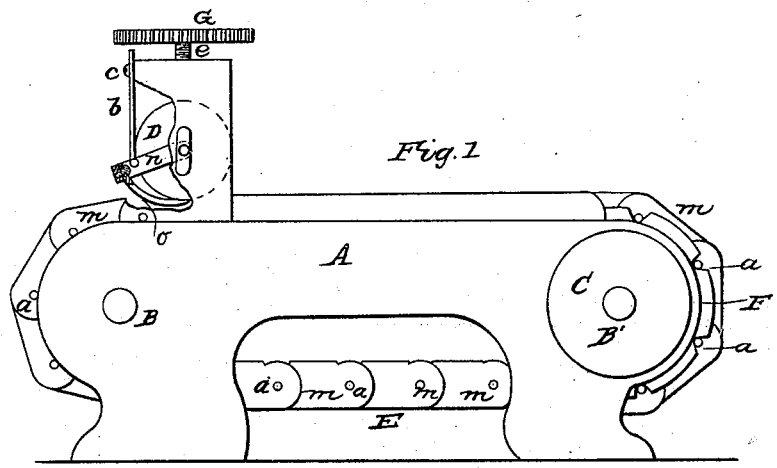
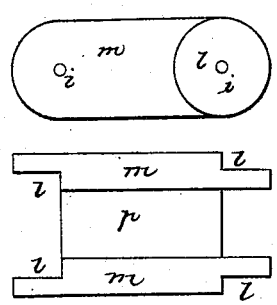
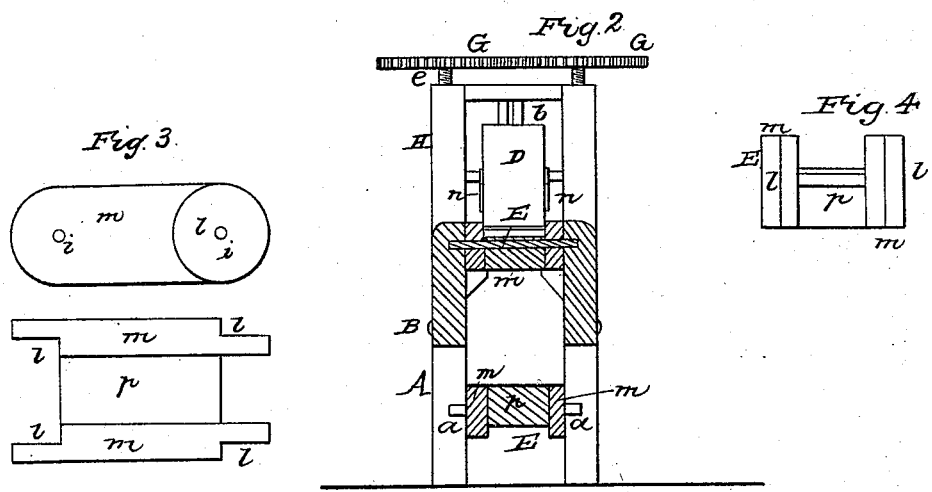
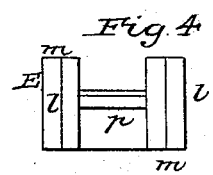
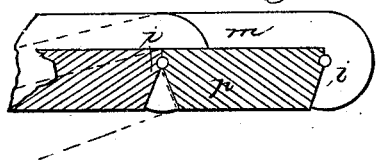
Witness.
P. T. Dodge
Inventor
John Blackie
By his Attorney.
W. E. Dodge

UNITED STATES PATENT OFFICE.

JOHN BLACKIE, OF NEW YORK, N. Y.

IMPROVEMENT IN MACHINES FOR MAKING PLUG-TOBACCO.

Specification forming part of Letters Patent No. 53,105, dated March 13, 1866.

*To all whom it may concern:*

Be it known that I, JOHN BLACKIE, of New York, in the county of New York and State of New York, have invented certain new and useful Improvements in Machines for Preparing Tobacco; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side view of my improved machine. Fig. 2 is a transverse vertical section on the line $x\ x$ of Fig. 1; and Figs. 3, 4, and 5 are views of parts of the same detached and more in detail.

My invention consists in pressing the tobacco into a continuous plug or strip by means of a trough, composed of sections or links united so as to form an endless chain, passing under a pressure-roller capable of adjustment at will, and in certain devices arranged to operate in connection therewith.

A represents the main frame, which may be of any suitable size and material. At each end of this frame is mounted a roller, the journals of which are shown at B. Around these rollers is stretched an endless trough, E. This trough is composed of sections, hinged together so as to form an endless belt, as shown in Fig. 1. These sections consist of a solid central bottom piece, $p$, as shown in section in Fig. 5, they being perfectly flat and smooth on their upper surface, and having their ends beveled, as shown, to permit them, when hinged together, to bend at the joint to pass around the rollers. Side pieces, $m$, are secured to the bottom pieces, $p$, so as to project upward and form the sides of the trough, the ends of these side pieces projecting longitudinally beyond the ends of $p$, to form the hinge or joints for uniting the sections. A hole, $i$, is made through the side pieces, $m$, as shown in Figs. 3 and 5, through which a rod, $a$, extends to unite the sections.

It will be observed that these holes $i$ are so located that when the sections are arranged in a straight line the adjoining ends of the bottom pieces, $p$, at their upper surfaces come into close contact, and thus form a tight joint at that point, as shown in Fig. 5.

The side pieces, $m$, at each end are circular in form, each end having a corresponding circular recess formed in its side, as shown at $l$ Fig. 3, to receive the adjoining end of the next piece, the recess $l$ being formed on one face of $m$ at one end and on the opposite face at the other end. The sections thus formed are duplicates of each other, and are united by simply putting the rod $a$ through the holes $i$. The ends of the rods $i$ project on each side beyond the outer sides of the side pieces, $m$, as shown in Fig. 2, for the purpose of resting in notches made to receive them in the radially-projecting flanges F of the roller at one end of the machine, as shown in Fig. 1, there being a similar flange at each end of the roller. Instead of using rollers, the notched disks F may be secured to the shaft B without any roller.

C represents a pulley attached to the shaft B′, for imparting motion to the belt E by any suitable means.

H represents standards projecting above the main frame A, in which is mounted a roller, D, of suitable length to fit into the recess of the trough, as shown in Fig. 2. This roller is mounted in boxes or bearings that are adjustable vertically by means of the screws $e\ e$, one having a right and the other a left handed screw-thread cut thereon, a gear-wheel, G, being secured to the top of each screw and gearing together, so that by turning either of them both ends of the roller D will be elevated or depressed uniformly.

A scraper, $o$, is secured to a frame, $n$, which is secured at its inner end to the journals of wheel D, so that the point of the scraper $o$ will always move when raised or lowered in a circle concentric to the surface of the roller. A slotted rod, $b$, is attached to the scraper-frame and project upward, as shown, a screw, $c$, passing through the slot, and thus holding the scraper at any desired height.

It is obvious that the devices for adjusting the scraper, and also the roller D, may be varied in a great variety of ways without at all affecting the results to be accomplished.

The operation is as follows: After the tobacco has been properly prepared for forming it into plugs it is placed upon or in the trough E, by which it is carried along and passed under the roller D, which compresses it into a compact strip of a width corresponding to the width of the trough and of greater or less thickness, according to the adjustment of the roller D.

The object of the scraper $o$ is to prevent the tobacco from adhering to the roller D.

An inclined chute or endless belt may either be used to receive the strip of tobacco as it issues from the end of the machine and convey it to a cutting-machine, by which the strip is cut into plugs of the required length, or, if preferred, the cutting apparatus may be connected to and operated in conjunction with this machine; but as these form no part of my present invention, they are not described in this specification.

By the use of my improved machine I am enabled to accomplish by machinery the labor which has generally been performed by hand, and to do it in a much more perfect and rapid manner.

Having thus described my invention, what I claim is—

1. The endless-belt trough E, constructed and operating as and for the purpose set forth.

2. In combination with the trough E, made as described, the roller D, arranged to operate as set forth.

3. The scraper $o$, arranged to move concentrically with the surface of the roller D, substantially as shown and described.

4. The combination and arrangement of the adjustable roller D, the screws $e$, and wheels G with the scraper $o$ and trough E, as and for the purpose herein set forth.

JOHN BLACKIE.

Witnesses:
   W. C. DODGE,
   P. T. DODGE.